United States Patent [19]

Cannon

[11] 3,778,787

[45] Dec. 11, 1973

[54] READBACK SYSTEMS FOR DIGITAL RECORDERS

[75] Inventor: Maxwell R. Cannon, Boulder, Colo.

[73] Assignee: International Business Machines Corporation, Armonk, N.Y.

[22] Filed: Apr. 9, 1973

[21] Appl. No.: 349,575

Related U.S. Application Data

[62] Division of Ser. No. 229,214, Feb. 18, 1972.

[52] U.S. Cl. .................... 340/174.1 H, 340/146.1 F

[51] Int. Cl. ............................................ G11b 5/02

[58] Field of Search .............. 340/174.1 B, 174.1 G, 340/174.1 H, 146.1 AL, 146.1 F, 146.1 AG; 179/100.2 S

[56] References Cited

UNITED STATES PATENTS

| | | | |
|---|---|---|---|
| 3,729,708 | 10/1971 | Wolter et al. | 340/174.1 B |
| 3,639,900 | 2/1972 | Hine, Jr. | 340/146.1 |
| 3,675,200 | 7/1972 | Bossen et al. | 340/174.1 |
| 3,685,015 | 8/1972 | Bocek | 340/146.1 |
| 3,569,948 | 3/1971 | Norris | 340/174.1 |

*Primary Examiner*—Vincent P. Canney
*Attorney*—Herbert F. Somermeyer et al.

[57] ABSTRACT

A digital magnetic recorder uses up to twice the Nyquist bandwidth of a data signal, plus a clock signal at a frequency exactly equal to the bit rate for reliably exchanging data signals with a magnetic media. The frequency response of the recording system is greater than twice the Nyquist bandwidth of the data signals to be recorded. Optionally, additional control signals at frequencies above or below the clock frequency but within the available recorder bandwidth may be recorded. Preferably, in a multitrack magnetic recording system, a signal component is added at a frequency near the clock frequency such that the difference between this signal and the clock has a wavelength on the magnetic media greater than the maximum skew of the multi-track system. Such signal component is usable as a resynchronization pattern. Additionally, write errors are detected during recording with special control indicia recorded on the media indicating such errors. Various forms of indicia are described including special data patterns, special signal components, and the like.

21 Claims, 8 Drawing Figures

PATENTED DEC 11 1973 3,778,787

SHEET 3 OF 3

READBACK SYSTEMS FOR DIGITAL RECORDERS

RELATED PATENT

This application is a division of Ser. No. 229,214, filed Feb. 18, 1972.

DOCUMENTS INCORPORATED BY REFERENCE

U. S. Pat. No. 3,639,900, by Harry C. Hinz, Jr., Issued Feb. 1, 1972, entitled "Enhanced Error Detection and Correction for Data Systems."

U. S. Pat. No. 3,641,534, by John W. Irwin, issued Feb. 8, 1972, entitled "Intra-Record Resynchronization in Digital Recording Systems."

BACKGROUND OF THE INVENTION

The present invention relates to digital magnetic recording and readback systems, particularly to those data systems operating at high linear recording densities.

Designs and methods for operating magnetic recording systems for digital data information have been a compromise between reliability and increased data throughput. Users of digital magnetic recording systems sometimes will sacrifice throughput to decrease the number of so-called permanent errors. Such reduction in permanent errors in a digital recording system for a given amount of data has often been accomplished by dividing the data into smaller blocks of recorded signals. Since, in present-day digital magnetic recording systems, a minimum spacing is usually provided between successive sets or blocks of data signals, such approach not only reduces the length of available tape for recording data signals in a given tape volume, but also reduces the throughput of the recording system in that the tape must traverse such nonrecorded areas to access recorded data signals.

In many present-day higher-density recording systems, the signals recorded on the media are recorded in a format such that the readback circuits of the recording systems are clocked or timed based upon the readback of signals; that is, such systems are "self-clocked." As used herein, the term "self-clocked" not only means timing the readback signal based upon detection of a signal-state change in a data representation on the media, but also to those variable frequency clock (VFC) systems wherein an oscillator is timed or phased to the readback signal; and then, in turn, times a detection circuit. In most self-clocked systems, if there is a temporary loss of signal, even though the VFC or self-clock readback system can synchronize time-wise to the readback signal, there is no definition of what the flux changes or transitions on the record media indicate; nor is there any indication as to the spatial or time relationships of one readback signal to another in a multi-track system. That is, the resynchronization of a readback signal portion of a magnetic recording system to a record track cannot be accomplished without further indicia as to the timing relationships of the various tracks and to the phase relationship of the signal being read back to data represented therein.

As recording densities increase, the probability of dropout or diminishment of readback signal amplitude and resultant loss of synchronization increases. That is, as the density increases, the wavelength recorded on the media decreases. This means that the amount of flux fringing from the tape toward a transducer has a shortened path requiring more stringent head-to-media relationships. Accordingly, at the higher densities, some means should be provided for enabling resynchronization both as to the phase of the readback signal and its relationship to the data represented, and as between the readback signal from a given track to all other tracks of a multi-track system.

Further, as data is recorded in a self-clocking manner, redundant signal portions are used for clocking indications. This unnecessarily increases the bandwidth of the signal being recorded and read back, as will become apparent. Since magnetic recording systems, by their nature, exhibit band-pass frequency characteristics, it is highly desirable that the minimum bandwidth be used for data recording. As densities increase, this becomes more and more difficult.

Previous recording systems have used resynchronization techniques which require special indicia to be recorded on a magnetic media which is interleaved among data signals. An example of such a resynchronization system is shown by the Irwin patent, supra. Other resynchronization schemes have been proposed and are described in the literature.

In some magnetic recording systems such as video recorders, not only are the data signals (video, etc.) recorded, but also a pilot or control signal is recorded outside the frequency band of the signals used to record the signals. In one such system, the data signals were recorded in the main lobe of the frequency response of the recording system. The control or pilot signal was recorded in a secondary lobe which resides in the frequency spectrum immediately above the main lobe. The amplitude obtainable in the secondary lobe with respect to the amplitude obtainable in the primary lobe of the recording system frequency response is about 6%. Those control signals were used to synchronize the playback of the data signals with respect to other apparatus such as a rotating head, movie projector, slide projector, and the like. It did not have any functional relationship to the reliable detection of the data recorded in the primary lobe of the data recorder.

Other systems have used high-frequency bias in connection with a data signal to be recorded. Those frequencies were sufficiently high that they were not readable by a playback system, but merely linearized the recording system, hopefully for enhancing playback. However, such systems do not provide for synchronization or resynchronization, but merely provide a greater fidelity in the recording system.

In other recording systems, a pilot or control tone resides in the main lobe of the magnetic recording system frequency characteristic preferably having a frequency lower than that of the data. While this is operable, it does not optimumly use the frequency band of the recorder.

Yet, other recording systems have recorded carriers, together with data signals, on a magnetic media wherein the data signals are side bands of the carrier. These systems also use the data recorder frequency pass band in less than an optimum manner.

SUMMARY OF THE INVENTION

It is an object of the present invention to provide an efficient signal recorder having a minimal pass band for the signals to be recorded and yet provide reliable readout.

In accordance with the present invention, data having a given repetitive frequency is recorded and read back from a magnetic media in association with a control signal having an integral multiple of the given repetitive frequency for clocking the data in the recording system. In a most-preferred form of the invention, the data signals occupy less than twice the Nyquist bandwidth of the data signal; while the control signal is exactly twice the repetitive frequency of the data, all of the signals residing within the first or main lobe of the frequency response portion of the recording system. Such control signal not only provides readback synchronization, but also linearizes the channel as a bias signal.

In a modification of the present invention, additional control signals are recorded at frequencies above the bandwidth of the data signals. Such additional control signals may contain useful information (by their presence or absence or beat frequencies between two such control signals) indicating control functions with respect to the recorded data signals. In one aspect of the invention, for a multi-track recorder, the control signals have an effective wavelength on the record media greater than the maximum skew of the media between various tracks and which is an integral multiple of the wavelength of the data recorded on the media.

Additionally, control signal recording is monitored for possible error conditions. Upon detection of an error condition, a special indicia is recorded on the media. Following the recording of the special indicia, or in conjunction therewith, the data associated with the write or recording error is rerecorded without stopping the media. Upon readback, a detection of the indicia indicates a re-recording of possible bad errors; and the readback circuits accommodate such re-recorded data for providing a true reproduction of the data.

Yet, in other aspects and features of the invention, the additional control signals are used as resynchronization points for resynchronizing readback circuits to a readback signal, as well as for re-establishing time relationships of the readback signals for effecting deskewing upon dropout or error conditions in a readback signal associated with the multi-track system. Such control signals also facilitate updating records in place. Other control signals are recorded for additional control functions in connection with data recovery.

In a further feature of the invention, upon detection of an error in a small number of record tracks in a multi-track system, having error correction code capable of correcting errors greater than the number of tracks in error, the system records a quality signal component in an additional control signal in association with the clock and data signals to indiciate to readback circuits the possibility of a given track being in error. Such recorded quality-indicating signals can be combined by the readback circuits with other quality signals generated during readback for verification of error location in recorded data signals.

The preferred control component is a constant-frequency sine wave recorded in the frequency spectrum above the data signal or the beat frequency between two such signals where one of the sine waves may be the clocking signal.

Combinations of the above features and utilization of such features in various forms and manner are well within the scope of the present invention.

The foregoing and other objects, features, and advantages of the invention will be apparent from the following more particular description of preferred embodiments of the invention, as illustrated in the accompanying drawing.

DESCRIPTION OF THE INVENTION IN THE FREQUENCY DOMAIN

Figure 1:
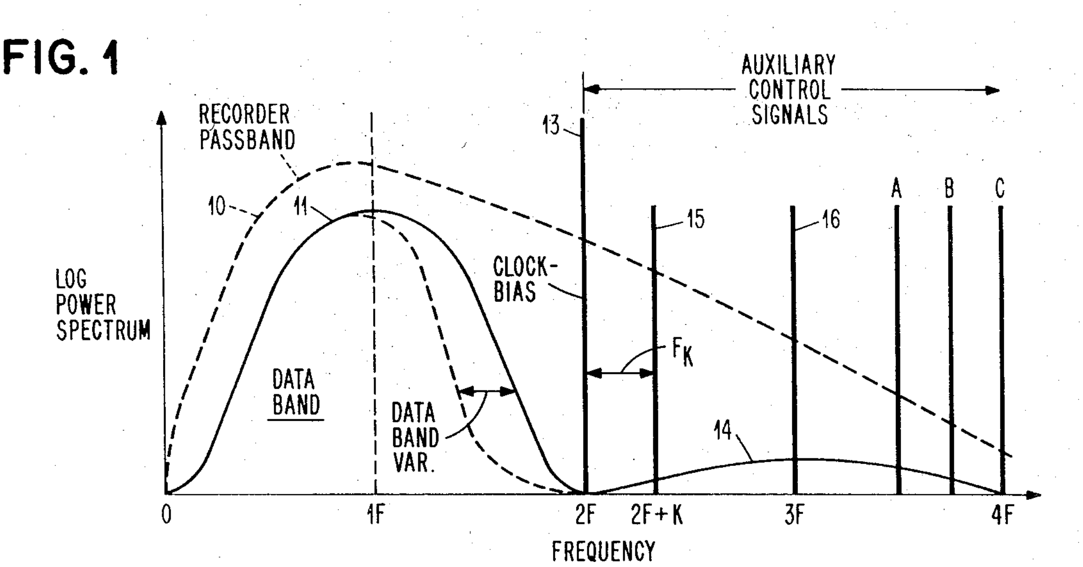
FIG. 1 is a simplified idealized showing of the invention in the frequency domain.

Referring first to FIG. 1, a typical frequency spectrum is illustrated. It should be noted that when magnetic media is interchangeable between a variety of magnetic media transporting devices, the actual frequency used will vary in accordance with the velocity of the media passing the transducer. For example, a record may be generated on a magnetic media at a tape speed of 200 inches per second and recovered or read back from that same media by a different drive at 100 inches per second. The frequency characteristics of the two tape transports or drives, insofar as signal-handling capabilities are concerned, are quite different. An important aspect of magnetic recording is that the wavelengths on the media itself are the same irrespective of the media velocity in a particular transport. Accordingly, the illustration in FIG. 1 has to be scaled for a particular medium velocity.

In any event, the frequency power response curve 10 of a recorder should encompass all of the signal frequencies used in practicing the present invention. The quality of the readback and recording will vary in accordance with the relationship of the signal frequencies and bandwidths and the recorder response, as is well known.

A novel method of the present invention is to select control signals and data bands in accordance with the frequency characteristics of the data being recorded and recovered from a magnetic recording. In this regard, it is desirable to minimize the bandwidth for making more efficient use of recording system response. In general terms, the data band 11 is a so-called "base-band" frequency bandwidth chosen to coincide with good response of the recording system. In order to more fully appreciate the selection of data band 11, reference must be first made to a Nyquist bandwidth. It is well known in communication channel theory that the Nyquist bandwidth (F) is the minimum bandwidth necessary for transferring information at a given rate. In a practical manner, such a minimum bandwidth cannot be utilized because of noise and other signal perturbing factors. According to a preferred practice of the present invention, the bandwidth of the data signal to be recorded may be limited by a filter to a value between one and two times the Nyquist bandwidth. A lowpass or bandpass filter is used in the reading process to improve the signal-to-noise ratio of the data signal and to enhance the practical upper limits of recording densities.

The data band 11 resides well within record system response 10. At 2F, twice Nyquist bandwidth is clock signal 13. The clock may be either a sine wave, a square wave, or other suitable timing signal. All of the energy in a sine wave clock signal 13 resides in the null between the major data band lobe 11 of the data frequency characteristics and the secondary data frequency lobe 14. Secondary lobe 14 is well known as being established in accordance with the distribution of frequencies, i.e., distribution of power, in clocked rectangular pulse digital data signals. It also has a second null at 4F. In addition to providing timing relationships for the recording system, the 2F clock signal AC biases the recording medium. The dual function arises from selecting the control signal frequency to be substantially lower than the usual AC bias frequency of 7-10 times data frequency.

It is interesting to note that clock frequency 2F equals the bit rate of the information in data band 11 whenever NRZI data representation techniques are used. One full clock cycle is recorded for each data bit period. A single bit is half of a minimum data wavelength. In other words, the clock frequency is twice the maximum fundamental data frequency. Data band 11 and clock 13 are base band signals. There is no modulation of any carrier signal. Clock signal 13 has a high amplitude compared to the data signal 11. As such, it AC biases the recording medium to increase recording sensitivity and improve linearity of the recording process. The increased recording sensitivity permits a substantial reduction in data power, which is very beneficial when a read head is located in close proximity to the write head to verify recording accuracy while the data is being written. High data recording signal power can interfere with the small signals which are read from the tape. Improved linearity reduces read signal distortion and increases data accuracy.

Many digital data recorders record in multitracks with one byte of data being recorded substantially simultaneously across the media in a plurality of tracks, for example, nine tracks in parallel in a ½-inch tape system. As such magnetic media is transported, the media is subject to skew, slewing, and other mechanical variations which appear as relative time perturbations in the various read signal channels (commonly referred to as dynamic skew). In addition, there are various fixed timing deviations among the tracks (commonly referred to as skew). In the readback circuits, there are deskewing apparatus which take the skewed signals read from the tape and assemble the signals into bytes for byte-oriented systems. Such deskewing apparatus is well known and used in multiple-track self-clocked recording systems.

As densities are increased, the probability of losing a signal from a given track for a short period of time greatly increases, such as caused by tape lift-off, tape defects, dust, and the like. Even though the signal may be recovered after a temporary loss of amplitude, there is no frame of reference from the signals received from the former deadtrack to all of the other tracks; so the deskewing apparatus cannot faithfully reassemble the readback signals into bytes of data. A previous system by John W. Irwin, supra, teaches intrarecord resync through the utilization of interleaved resynchronization bursts among data signals. The present invention enhances resynchronization over that taught by Irwin in that the resynchronization periods are more frequent and are recorded integrally with the data signals on a continuing basis throughout the entire record. In one sense, the resynchronization signals of the present invention are frequency interleaved rather than time interleaved, as taught by Irwin. Irrespective of the type of interleaving, the resynchronization marker points must have a spacing slightly greater than the maximum skew expected from the system. In readback systems, this can be expressed in the number of skew buffers used to accommodate the skew in the system. For example, if there are 15 skew buffers, then the resynchronization markers should be spaced in each track by at least 15 cell periods, bits, or recording areas. The resynchronization markers are recorded substantially simultaneously across the tape in all of the tracks forming sets of successive fiducial marks facilitating resynchronization.

According to one aspect of the present invention, such resynchronization marks are established in each track by supplying a second auxiliary control signal 15 at frequency 2F±K, wherein K is the reciprocal of the maximum skew expected from the recording system, i.e., 2F divided by the number of skew buffers in the readback circuitry. In one aspect, the beat frequency between control signals 13 and 15 constitutes the resynchronization markers of the present invention. Other signal portions may also be successfully employed for the purposes set forth. Such portions are termed "control components" used in connection with identification of data signal portions in data band 11. A second control signal 16 can be used in connection with control signals 13 and 15 or independently. In one application of additional control signal 16, its presence in the recording system indicates there have been no write errors in a given track for a space of time indicated by the beat frequency between control signals 13 and 15. When control signal 16 is removed for a period of time equal to a beat frequency between signals 13 and 15, a write error is indicated in that particular frame of deskewable signals. Other variations in using control signals 13, 15, and 16 with respect to the data signals in data band 11 will become apparent. It suffices to say at this point that the improved recording system of the present invention contemplates a relatively narrow data recording band, or not more than twice Nyquist bandwidth 11, with one or more control signals above the data band having predetermined preferably constant relationships with the data frequency F and with the frequencies of control signals 13, 15, and 16, etc.

ONE VERSION OF THE INVENTION DESCRIBED IN THE TIME DOMAIN

Figure 2:
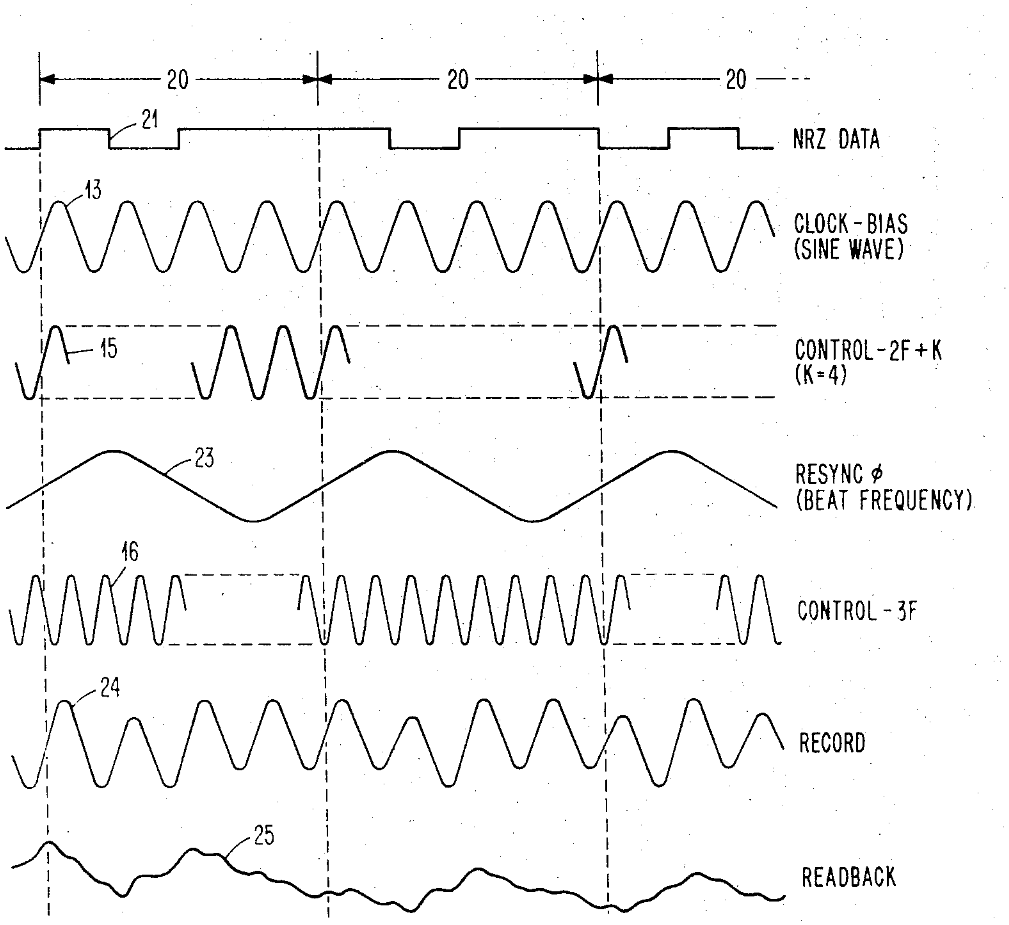
FIG. 2 shows sets of signal waveforms, some idealized and some simplified for showing operation of the invention in various modes and illustrating selected features of the present invention.

Referring to FIG. 2, idealized signal waveforms represent signals from one channel of a parallel multi-track system; or it can be from a serial single-track system wherein the data recorded in band 11 is set up in frames 20. In a multi-track system, the duration of frames 20 represents at least the expected maximum skew. NRZ data 21 residing in data band 11 is recorded and read back from the system in phase synchronization with sine wave clock 13. One complete cycle of clock 13 occurs between two successive transitions of NRZ data 21 at its highest data rate. Clock signal 13 times the detection circuit (later described) for recovering the location of transitions in NRZ data 21. Such transitions may be subjected to phase shift and other perturbations as is well known. In coordinating clock 13 with data 21, the time delays of the various circuits should be balanced to ensure a constant phase relationship between the clock and the data transitions. As shown in FIG. 2, the data is subjected to signal-state changes at the positive-going zero crossovers of clock 13, no limitation thereto intended. Such state changes could occur at the positive or negative peaks of clock 13 with equal facility.

Control signal 15 is shown as having a K = 2F/4 relationship to the 2F clock 13. As such, the resync phase, which is the beat frequency between signals 13 and 15, is shown at 23. In this particular instance, the boundaries of the frames are represented in beat frequency signal 23 as the positive-going zero crossings. Control signal 16 is shown as continuously activated; therefore, there are no error conditions in any of the illustrated frames 20. An idealized form of the recording signal expected by combining NRZ data 21 with the clock 13 is shown as signal 24; while an idealized readback signal is shown at 25. The additional variations in signals 24 and 25 introduced by control signals 15 and 16 are not shown for purposes of clarity. Anyone skilled in the art can visualize the additional effect on the signal waveform by those two control signals.

During readback of such signals, a 1.8F lowpass filter is provided for data band 11, separate narrow frequency-tracking filters are provided for control signals 13 and 15, and a third filter for control signal 16. The outputs of filters for control signals 13 and 15 are heterodyned to generate resync signal 23. Resync signal 23 is also a framing signal established by the beat frequency relationship of two control signals having predetermined frequency and phase relationships with respect to the data being recorded and reproduced.

In addition to utilizing the beat frequency between two control signals, narrow-band modulation techniques may be used on any one or all of the control signals. Other forms of modulation and intermodulation between control signals 13, 15, and 16 use only one or more of such control signals, the addition of other control signals at different frequencies, plus intermodulation relationships and utilization of various beat frequencies can be envisioned within the scope of the present invention.

SIMPLIFIED DESCRIPTION OF A SYSTEM USING THE PRESENT INVENTION

Figure 3:
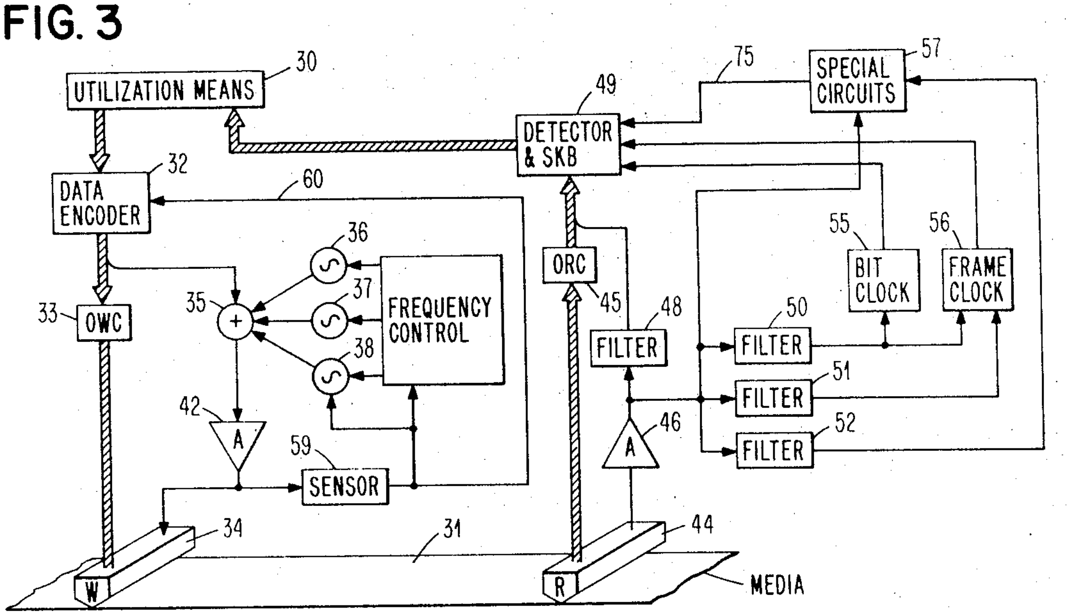
FIG. 3 is a simplified block diagram and diagrammatic showing of a digital magnetic recording system using the present invention.

Referring to FIG. 3, a data processing environment in which the invention is particularly applicable is shown. Utilization means 30, which may be a digital computer, central processing unit, or multiprocessing systems, generates data patterns to be recorded and is responsive to data patterns read from media 31 to perform data processing operations. Included in means 30 are channel exchanging means, multiplexing means, and the like, as may be found in a data processing system. In the alternative, it may merely be a keyboard recorder or a data display system of some simple design. Utilization means supplies coded signals to data encoder 32. Such a data encoder may be, without limitation, the one shown by Irwin in U.S. Pat. No. 3,624,637. Irwin teaches a conversion from a four-bit data set into a five-bit run-length limited code for use in data recording and reproducing systems. He also shows a five-bit to four-bit decoder usable in the readback portion of a data recorder.

In practicing the present invention, some form of encoding is preferred which may include error detection and correction codes. The invention may be practiced with equal facility without such error detection and correction codes and without such storage codes as taught by Irwin. In FIG. 3, the data is represented in NRZI data format. Other data formats can be used with the present invention.

Encoder 32 operates with all channels of multi-track media 31. For purposes of illustration, one of the channels is broken out; while the other ones are represented by OWC (other write circuits) 33 which also supply signals to write heads 34, respectively.

In each write channel associated with a given track on media 31, linear adder 35 receives the NRZI encoded data, clock signal 13 from source 36, control signal 15 from source 37, and additional control signal 16 from source 38. The linearly added signals are supplied through write amplifier 42; thence, to write or recording heads 34.

In a practical embodiment, the recorded signals on media 31 are recorded at one time, and then possibly transferred to a storage library for use later on. In the alternative, a revolving-type circuit, i.e., wherein media 31 is used as a time delay, may also use the present invention to advantage. In any event, FIG. 3 shows a set of read transducers or heads 44 in transducing relationship to media 31 for detecting the recorded flux as established by record signal 24. Other read circuits (ORC) 45 represent all but one of the readback channels, that being illustrated in greater detail. Read amplifier 46 amplifies the low-voltage signals from read transducer 44. Included in amplifier 46 may be sets of compensating filters for linearizing the response of the recording system from read amplifier 46. The data signals in the readback signal are passed by data band 11, filter 48, to detector and skew buffer system 49. System 49 may be constructed in accordance with known techniques with any form of NRZI detectors or other data-representing signal detectors.

The control signals 13, 15, and 16 are respectively passed through narrow band-pass filters 50, 51, and 52. In the event that the velocity of media 31 is subject to substantial perturbations, filters 48, 50, 51, and 52 may be of the frequency tracking type, the design of which forms no part of the present invention.

Filter 50 supplies the filtered clock signal to bit clock circuit 55. Circuit 55 may be a phase-lock loop type of clock supplying bit period indicating pulses to detector 49 in accordance with known techniques, but a simple limiting amplifier is preferred. Circuit 55 may include a time delay or phase shifting circuit for establishing the correct phase relationship between the clock signal and data. Simultaneously therewith, filters 50 and 51 both supply their respective filtered signals to frame clock circuit 56. Circuit 56 heterodynes the two signals together to generate signal 23 and then framing pulses for detectors in SKB 49. The signal from filter 50 may be time delayed or phase shifted if desired. The use of framing signal 23 for resynchronization and synchronization of the data read from media 31 may be in accordance with FIGS. 9 and 10 of Irwin, supra (resynchronization). Frame clock 56 for each track of recording generates a framing pulse in accordance with signal 23 in any known manner. Such framing pulse causes SKB to insert the next received data bit from the data detector into a reference deskewing position, as "0." In the event of missed bits, 0's are inserted in those portions of SKB skipped by the forced setting.

Filter 52 supplies its control signal 16 to special circuits 57. These may be error detection and correction circuits, pointer generating circuits, and the like, which have an effect on the operation of detectors and skew buffers 49, as described in the referenced documents. In any event, control signal 16 is interpreted by special circuits 57 to perform a special function within detectors and SKB 49 over and above identifying the bit periods and the frame periods associated with signals 13 and 15.

After all of the described readback circuits have performed their function, bytes of data are transferred back to utilization means 30 faithfully as supplied to data encoder 32.

WRITE RETRIES

In another aspect of the invention, write errors are continually sensed for by the write circuits and, when detected and without stopping the media, special indicia is recorded on the tape followed by a write retry. For example, sensor 59 is responsive to a perturbation in the write signal power having the frequency of clock 13 to indicate a write error; that is, no signal may have been recorded on the media 31. In such a case, oscillator 38 associated with control signal 16 is interrupted for one frame 20. This indicates to readback circuits 57 that the track associated with the interrupted control signal 16 may be in error. Such pointing is used by detector 49 to point to a possible track in error for combining same with an error correction code to facilitate data throughput. With one track in error, or possible one track in error, the writing may not require a retry. For example, an error correction code may have the power to correct two tracks in error without any error pointers while correcting three tracks in error with error pointers. Therefore, the threshold of a write retry can be two tracks in error indicated by two sensors 59 being actuated within the same frame 20.

Accordingly, in certain aspects of the invention, automatic write retries are enabled and indicated through the use of auxiliary control signals frequency multiplexed with data signals in a magnetic recording system.

Because signal dropouts in a single signal during readback may look like the just-described interrupted signal, to avoid inadvertent retry indication, several procedures may be followed. Special circuits can receive additional portions of the readback signal. If all signal portions are missing, a dropout and not a write retry is indicated. Absence of additional control signal 16, while amplifier 46 is supplying substantial readback signals, indicates a write retry. Other suitable procedures to accomplish similar results can be envisioned within the scope of the invention.

WRITE RETRY SEQUENCE

1. Assume error is detected by sensor 59 in a first frame 20 simultaneously with detection of the error. A control signal on line 60 is supplied to data encoder 32 causing it to hold the data for recording. At the end of that frame 20, sensor 59 supplies an inhibit signal to oscillator 38 interrupting control signal 16 during the next-occurring frame 20.
2. Re-recording the previous frame 20 data signals in the frame in which signal 16 is interrupted.
3. Continue recording in the normal manner if no write error is detected beginning with second frame 20. If an error is detected in second frame 20, rewrite the data again in a subsequent frame 20 and continue interrupting signal 16 until no write error is detected. Rerecorded data is in all tracks with only the track in error having its control signal 16 interrupted.

INTERPRETATION OF WRITE RETRY SIGNALS DURING READBACK

1. During a read in the forward direction, upon detection of a write retry interruption of control signal 16 in any given frame 20, discard the information signal read back during the previous frame 20. Such disregarding can be conditioned upon detection of an error in the readback signal. The criteria for defining the write retry interruption should be carefully adhered to.
2. When reading in the backward direction, upon detection of the interruption of control signal 16 in any given track, disregard the data in the next frame 20 from all tracks and continue to do so until signal 16 reoccurs.

It is seen that recording is retried upon detection of a write error. The seriousness of the write error can be evaluated before a retry is started. For example, if the error correction code associated with the recording system has an inherent capability of correcting two tracks in error, then a write error in one track can be ignored. The write retry interruption of control signal 16 in one track serves as a pointer in the readback circuits for being combined with the error detection and correction code for pointing to the track in error such that correction is enhanced. Of course, a signal dropout interruption of signal 16 also is a pointer in the readback circuits. Accordingly, a recording system is provided which employs write circuits having write error detecting means operatively associated with each channel or track of recording. The write circuit is responsive to a detected write error to record an error indicia in the track associated with the write error.

Various interpretations of such error indicating indicia can be provided in the readback system. In one form of the invention, any interruption of write error indication in the record media causes the readback system to disregard data in the frame having a predetermined relationship with the recorded indicia. Such disregarding can be conditioned upon detection of an error in the readback system or the inability of the readback system to correct the error. In any event, the data is re-recorded during successive retries until an error-correctable or error-free condition is established on the media.

Examples of magnetic recording systems using error pointers for enhancing magnetic recording operation are known and are shown by Hinz, Jr., in his patent, supra. The write error indicia recorded with the data in the present invention can be used as a pointer as taught by Hinz, Jr. In some complex data recording systems, prioritizing pointers and weighting pointers may be employed within the principles of the present invention.

In the event it is desired to limit the number of auxiliary control signals, other forms of write error indicia may be recorded within the principles of the present invention. For example, if there are two control signals associated with each frame of data in each respective track, one of the control signals may be frequency shifted for providing a different beat frequency, i.e., changing the length of the frame to indicate an error. The change is preferably an integral factor of frame length such that requeuing into deskewing apparatus is facilitated. Alternately, the control signals may be shifted closer together in the frequency domain for providing two frames in a given track where all the other tracks have a single frame for indicating the error condition.

In a further modification, where there is only one clock signal 13 associated with the data band, marker signals can be recorded in the data band for indicating errors. Such marker signals could bracket the re-recorded data and indicate to the readback system to ignore data having predetermined relationships with the marker signals as set forth with respect to the interruption of control signal 16.

While the invention has been described for recording in one direction only, i.e., forward, and reading in either the forward or backward directions of tape motion, it is equally applicable to those systems employing recording in both directions by adjusting readback system response to the write error indicia in accordance with rules arbitrarily selected to govern format generation and recording data signals.

READBACK AND RESYNCHRONIZATION OF WRITE RETRIES

Figure 4:
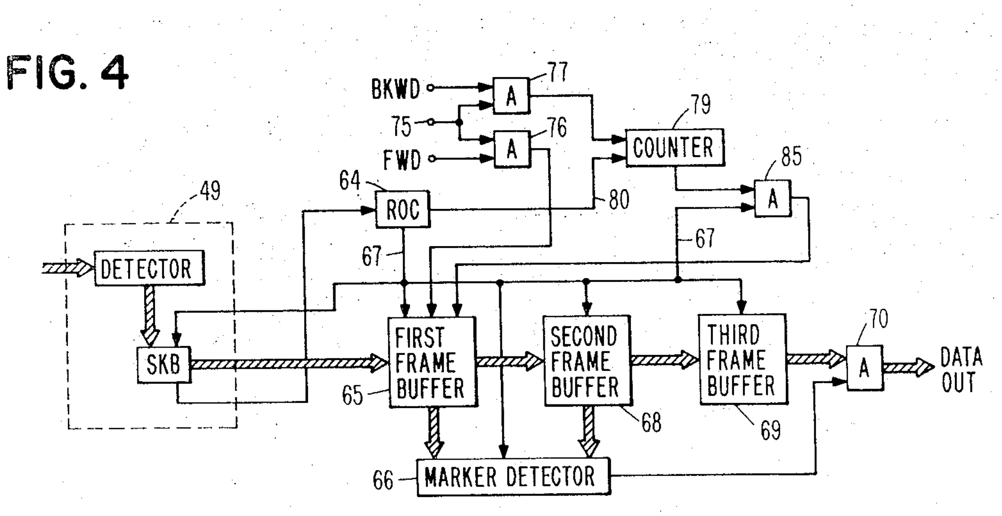
FIG. 4 is a simplified block diagram of a readback system using automatic resynchronization characteristics and error retry features of the present invention.

Referring next to FIG. 4, one simplified system usable to read back the above-described re-recorded data of a write retry is explained. One of the key factors in resynchronization and retries is maintaining the geometric relationship between the various tracks, i.e., maintaining identification of the relative position of the tracks at a given instant with respect to each and every other track. Such maintenance is referred to as skew accommodation. Irwin, supra, in FIGS. 9 and 10 of his patent, shows requeuing a deadtrack into a deskewing apparatus. The principles taught in those two figures are applicable to maintaining skew accommodation during a write retry resynchronization in accordance with the present invention.

Referring now to FIG. 4, circuits 49 as shown in FIG. 3 include a detector and a skew buffering system SKB. The detected signals are supplied asynchronously to SKB for deskewing in accordance with the teaching of Floros U.S. Pat. Re. No. 25,527. As soon as a byte of data is assembled in SKB, the byte is transferred to first buffer 65. The first buffer accumulates a number of bytes equal to a frame of data from the media. In the illustrated embodiment, four bytes constitute a data frame. ROC 64 is the readout counter referred to in Floros and has a modulus of 0–3, count position 0 being the reference position identifying a data frame. Upon stepping to position 0 from position 3, ROC 64 supplies a framing signal over line 67 to all circuits in the readback system. Simultaneously, the frame of data in buffer 65 is transferred to second buffer 68. The signals in second buffer 68 are transferred to third buffer 69 and, similarly, the frame of data in third buffer 69 is transferred through AND circuits 70 as data output.

As previously described, a write retry may be identified by recording marker signals in the data band 11. Additionally, special code permutations within data band 11 are used to identify portions or other control signals normally used in the data recording scheme. To this end, marker detector 66 is responsive to such code permutations residing in first buffer 65 and to the framing signal on line 67 to issue control signals for controlling the readback in accordance with the detected marker signals. In the case of a write retry, AND circuits 70 are inhibited in response to the described write retry markers. In this regard, when a first write retry marker is detected in first buffer 65, it is noted in marker detector circuit 66 that a write retry is being encountered. AND circuits 70 must be inhibited such that the marker signals are not supplied as data output. Accordingly, through the use of suitable memory means in marker detector 66, as the marker signal is transferred through second and third buffers 68 and 69, AND circuits 70 are inhibited as the third marker is transferred out of third buffer 69. In a similar manner, the originally recorded data signals are erased. For example, when the write retry marker is in first buffer 65, the data frame in error is in second buffer 68. To inhibit the transfer of data in error, AND circuits 70 are inhibited for two data frames as shown in Table I below:

TABLE I

| Time Frame | Buffer 1 | Buffer 2 | Buffer 3 | AND |
|---|---|---|---|---|
| 1 | D3 | D2 | D1 | + |
| 2 | E | D3 | D2 | + |
| 3 | M1 | E | D3 | + |
| 4 | M2 | M1 | E | − |
| 5 | R | M2 | M1 | − |
| 6 | M2 | R | M2 | − |
| 7 | M1 | M2 | R | + |
| 8 | D4 | M1 | M2 | − |
| 9 | D5 | D4 | M1 | − |
| 10 | D6 | D5 | D4 | + |

In the above table, D1 . . . indicate valid data frames, i.e., no write error indicia. The letter E indicates a frame in error; R indicates a write retry frame; and M1 and M2 indicate marker signals detectable by detector 66 as supplied by first and second buffers 65 and 68 for controlling AND circuits 70. A plus (+) sign indicates AND circuit 70 is enabled to pass a data frame, while a minus (−) sign indicates deletion of a frame. The table is set up such that a marker signal is generated in the data band which brackets the retry. This table is more particularly useful where recording can be effected in either direction of media motion.

For backward read, it is desired to delete frame 20 following the frame having the interrupted control signal. Accordingly, AND circuit 77 passes the interruption indicating signal on line 75 to set a one in delay counter 79. Counter 79 is advanced by the ROC 64 for each byte transferred from SKB by the control signals supplied over line 80. Additionally, AND circuit 85 is jointly responsive to counter 79 having one or more of a plurality of counts related to a frame (for example, in a four-byte frame having a count of 3 or 4 to allow for delays in supplying signals on line 75 to the framing signal on line 67) to reset first buffer 65. Resetting first buffer 65, therefore, erases the data bits in the frame following the retry frame which is the frame in error. As in the read-forward direction, it may be desirable to delete the byte count and, therefore, inhibit transfer of all zeroes to the buffering system.

Returning now to the readback of data signals having write error indicia in accordance with the interruption of control signal 16, special circuits 57 of FIG. 3 supply their interruption indicating signal over line 75 to the readback circuitry illustrated in FIG. 4. In the read-forward direction, the frame in error is contained in first buffer 65; while the re-recorded data is being accumulated within SKB of circuits 49. Accordingly, the signals in first buffers 65 are to be erased. A forward signal from control circuitry (not shown) enables AND circuit 76 to pass control signal 75 for resetting all bits in first buffer 65. This action erases the frame in error. Other circuitry may be optionally added for including transfer of all zeroes through the second and third buffers, i.e., maintaining a byte count to be a constant in the event the data processing in the system associated with the recording subsystem has a predetermined byte count and will not interpret the all zeroes as data. Table II below illustrates the timing relation.

TABLE II

| Delayed Frame φ | 1 | Buffer 2 | A1 |
|---|---|---|---|
| + | D2 | D1 | + |
| + | E | D2 | + |
| − | R | E | − |
| + | D3 | R | + |

In Table II above, the same symbology is used as in Table I with the control signal 16 being active when the + sign is in its column and interrupted when the − sign is in its column.

From the above tables and description, it is seen that media utilization is enhanced by applying write error indicia to the auxiliary control signals rather than employing write error indicia within the data band. Accordingly, that is the most-preferred form of the present invention in regard to write retry and recovery.

A PREFERRED READBACK SYSTEM EMPLOYING WRITE RETRY CAPABILITIES

Figure 5:
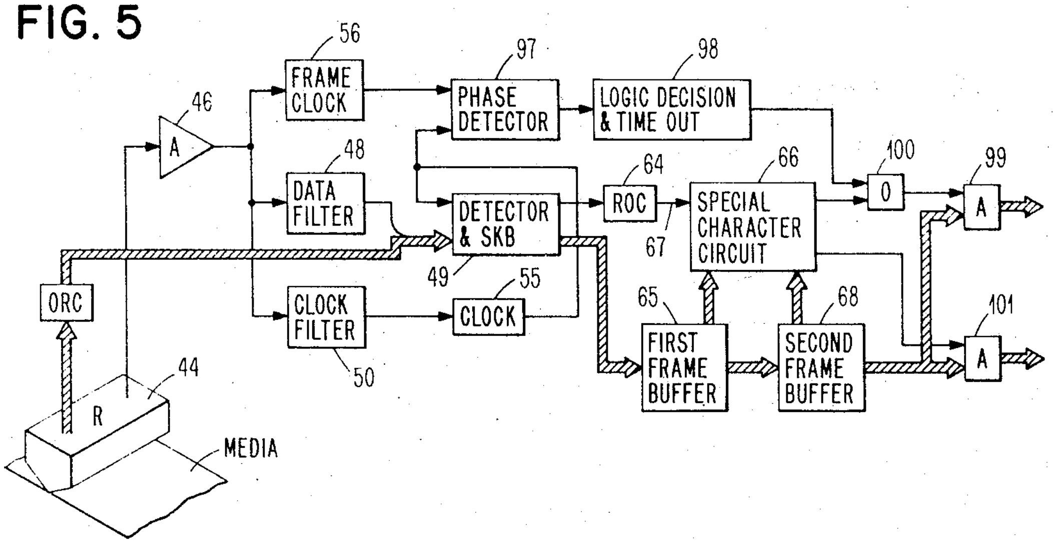
FIG. 5 is another simplified block diagram of a readback system using the present invention wherein a quality signal is recorded as a signal component multiplexed with a control signal associated with recorded digital signals.

Referring to FIG. 5, an additional readback system is shown. Readback transducer or head 44 for one track supplies its readback signal to amplifier 46. Amplifier 46 supplies its amplified readback signals to a data filter 48 for supplying data signals to data detector and deskewing apparatus 49. From detector 49, the deskewed data bytes are supplied to special character circuits or marker detector 66, as well as to first buffer 65 and second buffer 68. Note that the third buffer of FIG. 4 is not used. Each of the buffers and the data detector are capable of storing one data frame 20. A framing pulse on line 67 is supplied for special character circuit 66.

Additionally, frame clock circuit 56 receives both the clock and auxiliary control signals 13 and 15 for generating framing signal 23. In accordance with this embodiment, auxiliary control signal 15 is frequency shifted to replace the error indicia of interrupting control signal 16. Accordingly, clock signal 13 supplied through clock filter 50 to bit clock 55 is phase compared by detector 97 with the signal generated by circuit 56. If the phase is coherent, as shown in FIG. 2, the logic decision by circuit 98 indicates valid data enabling AND circuits 99 to pass data from buffer 68. OR circuit 100 joins the control signal from decision circuit 98 and special character circuit 66 to jointly control AND circuits 99. Upon detection of a phase shift by detector 97, decision circuit 98 which may include timing or other media displacement metering means for one frame 20, inhibits AND circuit 99. Detection of a marker signal by circuits 66 opens AND circuits 101 while closing AND's 99 for passing signals to effect control functions not pertinent to the present invention.

In the preferred form of the FIG. 5 version of the invention, the framing signal, i.e., the beat frequency between control signals 13 and 15, is shifted to a higher frequency for minimizing required space on media 31 for handling the write error indicia; no limitation thereto is intended.

The timing relationship of the data and buffer frames for reading in the forward or write direction is shown in the below table.

TABLE III

Readback of Write Retry

Idles

| Frame φ | Buffer 1 | Buffer 2 | AND |
|---|---|---|---|
| + | D2 | D1 | + |
| + | E | D2 | + |
| − | R | E | − |
| + | D3 | R | + |

In the above table, the + signs indicate normal framing relationships, i.e., normal phase, such that decision circuit 98 is supplying an AND circuit activating signal and AND circuit 99 is passing data signals. When a − sign is applied, AND circuit 99 is inhibited. D1 and D2 indicate valid data frames; E indicates a data frame in error; and R indicates the re-recorded or retried frame not in error.

As will be later described, the deletion of the frames in error, evaluation of write retries, and the like, can be microprogrammed in a programmable peripheral controller. In that event, the circuitry shown in FIGS. 4 and 5 can be simplified to a certain degree.

SIMPLIFIED DESCRIPTION OF RECORDING CIRCUITS EMPLOYING WRITE RETRY AND WRITE ERROR POINTER RECORDING

Figure 6:
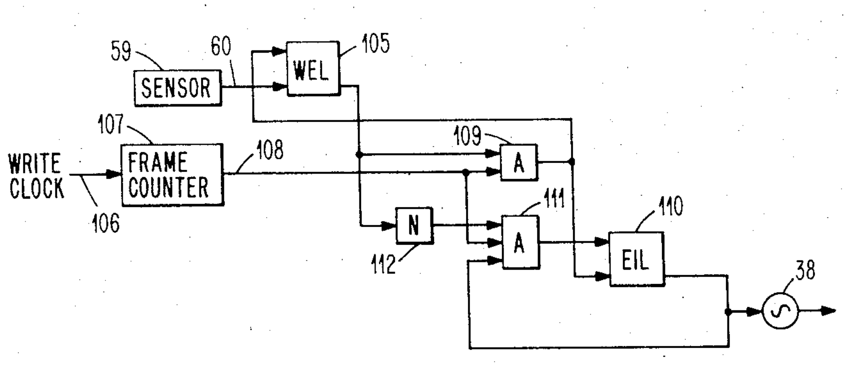
FIG. 6 is a simplified block diagram of a recording portion of a magnetic recording system showing generation of quality signal generation during a write mode.

Firstly, referring to FIG. 6 which is an abbreviated showing of FIG. 3's write or recording section, sensor 59 supplies its write error indicating signal over line 60 setting write error latch (WEL) 105. This latch conditions indicia generating circuits for recording the write error indicating indicia on media 31 in the next-occurring frame 20. Write clock from the recording system source or data encoder 32 (generated in a known manner) continuously supplies its pulses over line 106 to cycle frame counter 107. When the frame counter passes a reference state, indicating the boundary between two successive frames 20, it supplies an activating signal over line 108 enabling AND circuit 109. Error latch 105 signal then passes, setting error indicia latch (EIL) 110 and resetting WEL 105. Latch 110, when set, inhibits control signal 16 oscillator 38, as above described. Upon completion of the frame, during which control signal 16 is inhibited, frame counter 107 supplies its activating signal to AND circuit 111. This AND circuit is jointly responsive to the error indicia latch and the reference signal to reset the error indicia latch, thereby reestablishing control signal 16 generation. In the event two frames in error have been detected, error latch 105 having been set simultaneously with setting error indicia latch 110, provides an inhibit signal through inverting circuit 112 to AND circuit 111. This action stops oscillator 38 for a succession of frames 20 in error.

From the above description, it is apparent that other forms of error indicia generating circuits may be provided. For example, if data band 11 is to be used for recording write error indicia, circuitry such as described by Irwin, supra, may be used. The frame synchronization can be employed as shown in Irwin's FIG. 6.

Figure 7:
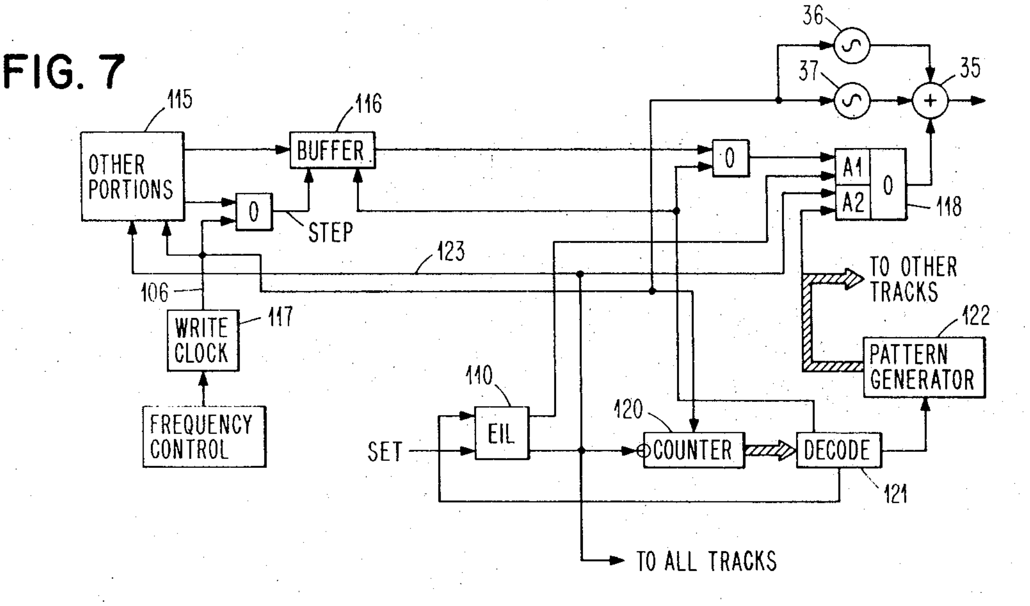
FIG. 7 is a showing of sets of simplified data formats of media showing the present invention in other aspects.

In the event error indicia is to be recorded in the data band, the configuration in FIG. 7 may be used. Other portions 115 can include an I/O controller, program means, and the like for generating data signals to be recorded. Buffer 116 receives the data signals and buffers them for enabling write retries. Buffer 116 preferably has a capability of storing at least one frame of data per track, and supplies the buffered data under write clock 117 control for establishing the recording frequency. The supplies signals pass through AND/OR (AO) 118 to linear adder 35. EIL 110 is controlled as shown in FIG. 6. When reset, it enables A1 portion of A0 118 to pass data signals. When set to the active condition, i.e., a retry is in process, and marker signals are to be recorded, A2 portion of A0 118 is enabled. EIL 110 also supplies its signals to the other tracks for simultaneously re-recording all data from the frame in error. EIL 110 enables counter 120, which is triggered by write clock 117 to count one frame. Decoder 121 is responsive to the counts in 120 to actuate pattern generator 122 to supply marker signals through A2 portion of A0 118. After two of these marker signals have been supplied, A1 portion of A0 118 is enabled by decode 121 for one frame. Simultaneously, the step control signal is supplied to buffer 116 for retransferring the data bytes from the frame in error to A1. Note that EIL 110 supplies a control signal to other portions 115 and buffer 116 causing buffer 116 to hold the data to be re-recorded for the required period of time. Upon completion of re-recording or retrying the signal recording, two more marker signals are generated by pattern generator 122. Upon completion of the marker signals, decode 121 supplies a reset signal to EIL 110 and a control signal to buffer 116 and other portions 115 over line 123 indicating "resume normal operations." The above-described simplified logic diagram generates a data pattern in accordance with that shown in Table I above for a write retry. Other forms of recording write error indicia within data band 11 can be used. Note that oscillators 36 and 37 are both used for generating the framing and bit clocks under control of write clock 117.

Figure 8:
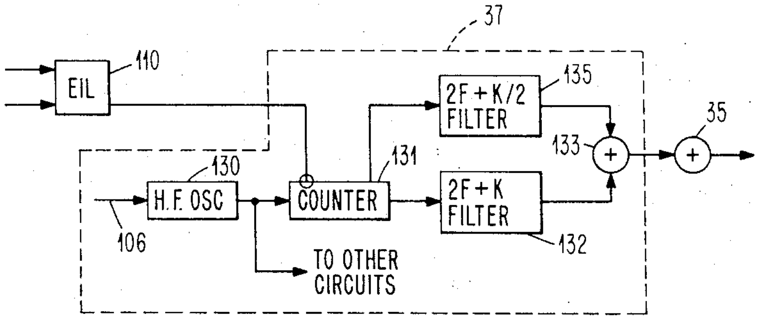
FIG. 8 is a simplified signal-flow block diagram of a recording system constructed in accordance with one aspect of the invention.

Another version of recording write error indicia is shown in FIG. 8 wherein control signal 15 is frequency shifted toward clocking signal 13 for decreasing the framing size from four bits to two bits. EIL latch 110 is set and reset as described for FIG. 6. It supplies its enabling signal to oscillator 37 for controlling the generation of auxiliary control signal 15. In the illustrated embodiment, oscillator 37 is synchronized by the write clock signal received over lines 106. High-frequency oscillator (HFOSC) 130 is phase synchronized to write clock 106 in a known manner. It preferably has a periodicity much shorter than that of the write clock for enabling smoother transitions during the frequency shifting. Counter 131 frequency divides HFOSC 130 signals to the frequency 2F+K for generating control signal 15. Filter 132 receives the pulse output from counter 131 and changes it to a sine wave. Linear adder 133 then supplies a control signal to linear adder 35. Upon a frequency shift, EIL 110 supplies an enabling signal over line 34 to counter 131. It then frustrates the count beginning at the zero crossover of the output of filter 132 in a known manner and generates frequency 2F+ K/2. Filter 135 is tuned to that frequency for supplying a lower frequency sine wave to the linear mixer 133 and thus provides the frequency-shifted control signal to linear adder 35. By switching at zero crossovers, some signal perturbations are avoided.

From the above description, it is apparent that many forms of write indicia can be faithfully generated using the principles of the present invention. These include forms of control signal modulation, generation of marker signals, and the like which can be used to successfully practice the broad aspects of this invention with regard to write retry and indicating write errors for generating pointer signals resident with the data on media 31. Note that no extra tracks are needed; all that is required are additional filters and control circuits, both in the recording and readback portions. Accordingly, a permanent record associated with the data which may be in error is generated directly on the media for use by any readback circuit to be associated with the magnetic record.

The parent application, Ser. No. 229,214, illustrates and describes electrical circuits and techniques for detecting write errors. Known separate read and write gaps may be employed to practice the invention in addition to those techniques illustrated in such parent application. Also, the terms "clock-bias" and "synchronous bias" are equivalent. Synchrnous bias, even though not necessarily used for readback clocking, provides enhanced biasing by reducing intermodulation effects, as has been described.

While the invention has been particularly shown and described with reference to preferred embodiments thereof, it will be understood by those skilled in the art that various changes in form and details may be made therein without departing from the spirit and scope of the invention.

What is claimed is:

1. A readback system for a magnetic record member including the combination:

means establishing a readback signal based upon magnetization of said record member;

first means responsive to a first frequency portion of said readback signal to detect data signals therefrom; and second means responsive to a second frequency portion of said readback signal to delete some of said detected data signals and substitute other data signals therefor received from said media in a predetermined time relationship to said second frequency portion signal.

2. The readback system set forth in claim 1 further including means responsive to a third frequency portion of said readback signal to identify groups or frames of said detected data signals and said third-mentioned means being responsive to a second portion of said readback signals only if said second portion has a signal state for the duration of a frame before deleting any of said detected data signals.

3. The system set forth in claim 2 wherein said third means deletes data signals in the frame said second frequency portion second state occurs and substituting data signals from the next subsequent frame for deleted data signals.

4. The system set forth in claim 3 having a plurality of tracks on a magnetic record and a like plurality of the apparatus set forth in claim 2 for the respective tracks on the media;

buffering means for receiving said data signals from said second-mentioned means for storing a plurality of frames of said detected data signals; and means responsive to said third-mentioned means associated with any of said tracks for erasing detected data signals from all of said tracks in one of said buffer means and substituting data signals in all of said tracks in a subsequent received frame of data for such erased detected data signals.

5. The readback system set forth in claim 4 further including:

transducing means in said establishing means;

means relatively moving a record member with respect to said transducing means;

direction of record member relative motion indicating means; and said second responsive means being responsive to said direction indicating means to either ignore or read signals having said predetermined time relationship to said second frequency portion signal.

6. The readback system set forth in claim 5 wherein said second responsive means supplies a control signal having a predetermined frequency association with said detected data signals, and said establishing means being responsive to said control signal to perform a readback adjusting function on said data signals in accordance with said control signal.

7. The readback system set forth in claim 6 including means in said establishing means for simultaneously receiving signals from a plurality of record tracks on said record, and said establishing means being responsive to said control signal to perform said readback readjusting function simultaneously on signals from all tracks.

8. The readback system set forth in claim 1 wherein said second frequency portion signal for each track has an effective frequency of exactly twice the data rate frequency of said first frequency portion and having a constant phase relationship with respect to said data signals.

9. The readback system set forth in claim 1 wherein said second means includes error correction and detection means, said error detection and correction means establishing a set of check bits on a set of detected data signals wholly confined within one wavelength of said signal in said second frequency portion and said one wavelength having a duration equal to the duration of an integral number of said detected data signals.

10. The readback system set forth in claim 1 for a multitrack magnetic record system and having one each of all of said means for each track;

a signal establishing monitoring means for each said establishing means, each said monitoring means operating independent of every other of said monitoring means; and means in each of said second means responsive to the respective monitoring means to indicate an error condition and all said second means for all of said tracks respectively responsive to such error indication to delete said detected data signals from the respective tracks.

11. The readback system set forth in claim 10 wherein each said establishing means includes signal filter means passing said data signals in a base pass band of up to twice the Nyquist bandwidth of frequency of said data signals and a second filter means having a narrow pass band at twice said Nyquist frequency for selecting said second frequency portion signal for said second means.

12. The readback system of claim 11 further including means in each said establishing means supplying signals derived from said readback signal in addition to said first and second frequency portion signals;

additional means for combining selected ones of said signals to generate additional control signals; and means in each said second means responsive to said additional control signals to perform additional readback functions on said detected data signals.

13. The readback system of claim 11 wherein each said establishing means includes third filter means having a narrow pass band at a frequency displaced from a frequency of said second frequency portion signal a predetermined submultiple frequency of said Nyquist band frequency;

control means responsive to said readback signal for establishing signal components at said displaced frequency; and operating means in said second means responsive to said second frequency portion and displaced frequency signals to adjust operation of said establishing means in accordance with said error indications.

14. The readback system set forth in claim 13 including means controlling said control means to establish said displaced signal in a manner to establish said error indication in relatively identical timing relations to readback signals from all tracks on said media as a reference characteristic identifying signal groups on said media; and deskewing means in said second means receiving detected data signals from said first means for aligning detected data signals in signal groups, one signal from each track, and responsive to said reference characteristic to reset alignment of signals to said signal groups.

15. A readback system for a multitrack digital signal recorder wherein record media is subjected to a predetermined maximum skew with respect to a readback transducer means;

a plurality of record tracks on said media subject to said skew;

a separate independent single-track readback system portion for each track consisting of the claim 1 subject matter;

further including in combination:

framing means operatively connected to all said second means of said single track systems for generating framing signals for all said tracks based upon said second frequency portion, which framing signals have certain unique wavelength characteristics repeated at intervals not less than said predetermined maximum skew; and each said establishing means being individually responsive to said framing signal to introduce control signals along with each said readback signal to independently indicate frames of signals in each track in a fixed relationship to frames in each and every other track.

16. The method of operating a readback system for a magnetic recording system including the steps of:

establishing digital data-indicating signals based upon recorded indicia and having a given periodicity and limiting the bandwidth of said data-indicating signals within the readback system to twice the Nyquist band of said data;

establishing a control signal from said readback signal having a frequency equal to twice the Nyquist frequency of said data-indicating signals and establishing a pass band in said readback system greater than twice the Nyquist frequency of said data-indicating signals; and combining said control and data-indicating signals to supply output detected data signals with timing indications established by said control signal.

17. The method set forth in claim 16 further including the steps of grouping said data-indicating signals into groups of signals having a small number of signals greater than one, and receiving another signal from said readback signal having a wavelength characteristic encompassing one group of signals and re-establishing said grouping step at one extremity of said wavelength characteristic.

18. A multichannel readback circuit for a magnetic recording system, including the combination:

transducing means operatively associated with each recording channel for sensing recorded signals and supplying corresponding readback signals;

indicia means responsive to said readback signals to indicate a detected write error indicia received from a record channel;

means for detecting said indicia;

means for receiving said readback signals for detecting data errors in said readbck signals; and means combining said detected error indicia and said data error detection to correct said data error.

19. A magnetic recording readback system having means for effecting relative displacement between a record member and a transducer for enabling record sensing transducing operations along tracks in the media caused by relative scanning of said transducer with respect to said media, said readback system having a given frequency pass band;

the improvement including in combination:

data signal processing means associated with said transducer for effecting data signal processing and detecting operations within a frequency band substantially equal to twice the Nyquist bandwidth of data represented in signals received from said media via said transducer;

control means operatively associated with said data signal processing means and said transducer establishing a substantially single-frequency control signal at one extremity of said frequency band and having a relatively fixed phase relationship to one signal frequency in said twice Nyquist band; and means in said data signal processing means responsive to said single-frequency control signal to adjust said readback signal processing operations in accordance with said control signal.

20. The system set forth in claim 19 further including additional control means jointly responsive to said signal processing means and to said control signal to establish signal components in frequency juxtaposition to said control signal outside said twice Nyquist bandwidth for establishing further identifying signals with respect to signals in said twice Nyquist bandwidth; and means in said signal processing means responsive to said identifying signals to adjust the timing of said readback signal processing operations.

21. A multitrack system for having a single record member with plural parallel signal tracks, a recording system as set forth in claim 19 for being operatively associated with each of said tracks;

a multitrack readback system improvement including in combination:

multitrack control means operative with each said claim 19 recited control means, said signal processing means and transducer means, means identifying groups of signals exchangeable with said media tracks in a substantially simultaneous manner and means processing another control signal having a wavelength characteristic in a constant predetermined relation to said first-mentioned control signal for retiming operations of selected ones of said signal processing means for realigning timing of signals received for all tracks.

* * * * *